No. 688,648. Patented Dec. 10, 1901.
C. H. KAYSER.
TAKE-UP MECHANISM FOR PROJECTING KINETOSCOPES.
(Application filed Jan. 7, 1901.)
(No Model.) 2 Sheets—Sheet 1.
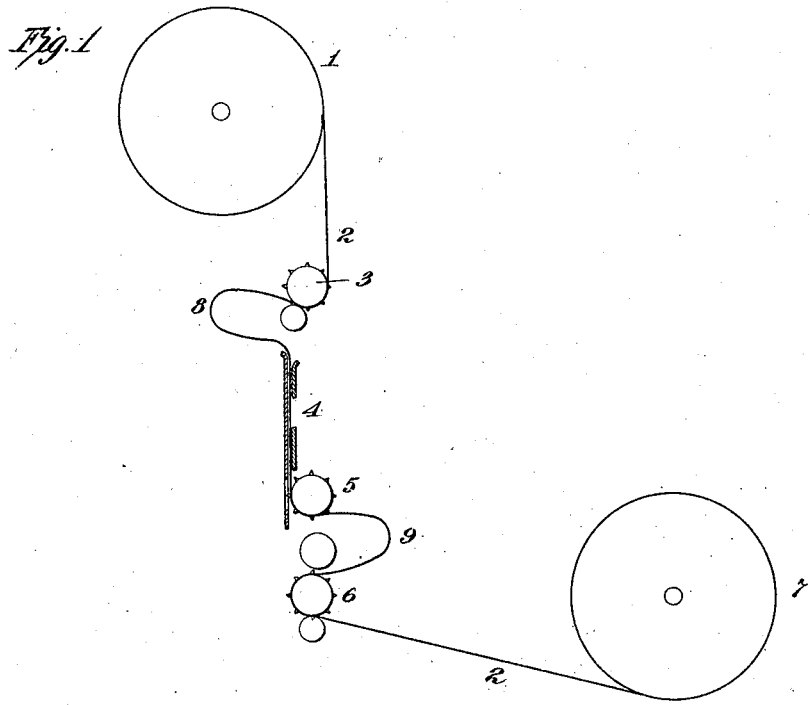
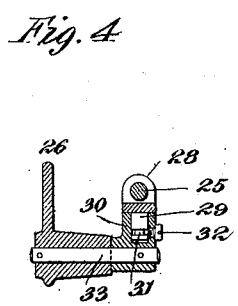
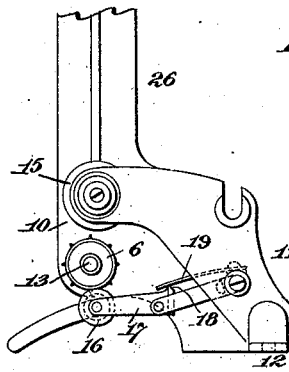
Witnesses:
Jas. F. Coleman
Archibald T. Reese
Inventor
Charles H. Kayser
by
Ayer Edmonds & Ayer
Att'ys.

No. 688,648.　　　　　　　　　　　　　　　　　　Patented Dec. 10, 1901.
C. H. KAYSER.
TAKE-UP MECHANISM FOR PROJECTING KINETOSCOPES.
(Application filed Jan. 7, 1901.)
(No Model.)　　　　　　　　　　　　　　　　　　2 Sheets—Sheet 2.
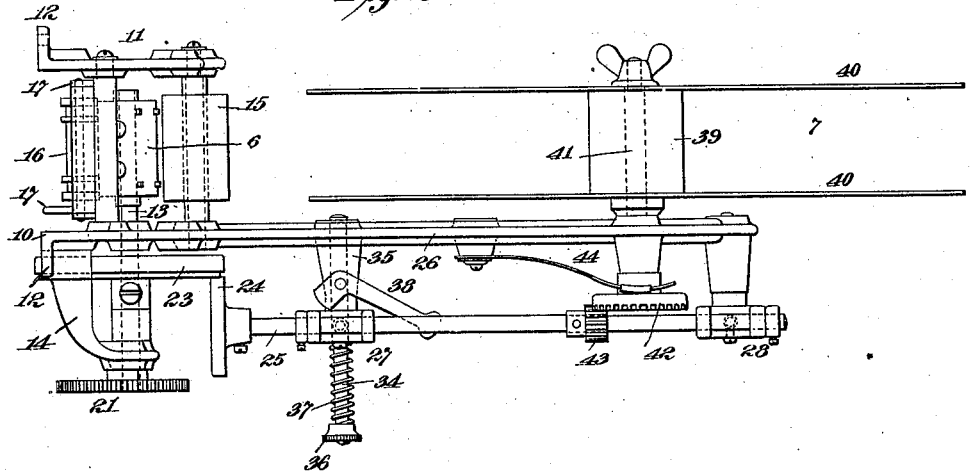
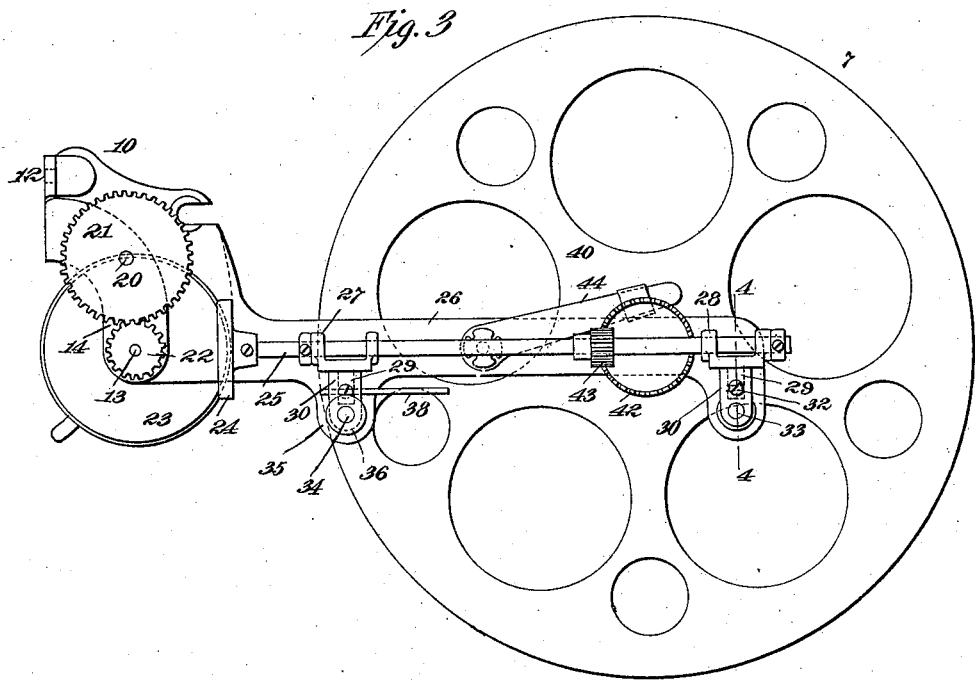
Witnesses:　　　　　　　　　　　　　　　　　Inventor

UNITED STATES PATENT OFFICE.

CHARLES H. KAYSER, OF ORANGE, NEW JERSEY, ASSIGNOR TO THE EDISON MANUFACTURING COMPANY, OF ORANGE, NEW JERSEY, A CORPORATION OF NEW JERSEY.

TAKE-UP MECHANISM FOR PROJECTING-KINETOSCOPES.

SPECIFICATION forming part of Letters Patent No. 688,648, dated December 10, 1901.

Application filed January 7, 1901. Serial No. 42,300. (No model.)

*To all whom it may concern:*

Be it known that I, CHARLES H. KAYSER, a citizen of the United States, residing at Orange, in the county of Essex and State of New Jersey, have invented certain new and useful Improvements in Take-Up Mechanism for Projecting-Kinetoscopes, of which the following is a description.

My invention relates to an improved take-up device for use in connection with moving-picture projectors or cameras, and the improvements have been particularly designed for employment with projecting-kinetoscopes.

My object is to provide a simple and efficient mechanism which can be readily applied to or removed from the exhibiting machine or camera wherein the film will at all times be properly accumulated on the take-up reel and wherein simple and effective provision is made for permitting the unwinding of the film from the take-up to the let-off reel after an exhibition has been made.

For purposes of illustration I shall describe my invention in connection with a projecting-kinetoscope; but it will be obvious that it may be employed with other forms of moving-picture-exhibiting machines or cameras wherein a take-up mechanism is desirable.

In order that the invention may be better understood, attention is directed to the accompanying drawings, forming part of this specification, and in which—

Figure 1 is a diagrammatic view of the let-off reel and feed-rolls of a projecting-kinetoscope, showing diagrammatically my improved take-up device in connection therewith; Fig. 2, a plan of the take-up mechanism detached; Fig. 3, a side view of the same; Fig. 4, a section on the line 4 4 of Fig. 3, and Fig. 5 a view of the other side of a portion of the take-up mechanism from that shown in Fig. 3.

In all of the above views corresponding parts are represented by the same numerals of reference.

Referring first to Fig. 1, the let-off reel 1 of a projecting-kinetoscope carries a length of film 2 wound thereon, which film is passed over the continuously-operating feed-roll 3, past the light-opening 4, over an intermittently-operating feed-roll 5, around the continuously-operating feed-roll 6 of the take-up mechanism, and finally to the take-up reel 7. The film is formed into loops 8 and 9 on either side of the intermittently-operating feed-roll 5 in order that only a small length of the film may be required to be intermittently moved. The gearing between the several feed-rolls 3, 5, and 6 is so proportioned as to maintain a loop at all times on each side of the intermittently-operating feed-roll, as will be understood.

My improved take-up mechanism is provided with two frames 10 and 11, each having a slotted foot 12 for removable attachment to a convenient element of the projecting machine or camera. Mounted in the frame 10 is a shaft 13, which is supported outside of the frame in a bearing carried by an arm 14, and between the frames the shaft is provided with the feed-roll 6, before referred to. By leaving the end of the shaft 13 free and clear the film can be readily engaged with or disengaged from the feed-roll, as will be understood. A friction-roll 15 is rotatably carried adjacent to the feed-roll 6 and over which the film is passed before engaging the feed-roll. Preferably the feed-roll 6 is provided with feed-teeth thereon for engaging openings in the side of the film. Below the feed-roll 6 is a friction-roll 16 for holding the film in engagement therewith, said friction-roll being carried in arms 17, having cam ends 18, with which a spring 19 coöperates to hold the friction-roll in and out of engagement with the feed-roll 6, as will be obvious. Mounted in the bracket-arm 14 is a stub-shaft 20, on which rotates a spur-gear 21, which engages with and drives a pinion 22, keyed to the shaft 13. The spur-gear 21 is so located as to be engaged and driven by one of the gears of the projecting machine or camera at the proper speed to rotate the feed-roll 6 at the same surface velocity as the feed-roll 3.

Keyed to the shaft 13, between the bracket-arm 14 and the frame 10, is a friction-disk 23, the outer surface of which is covered with leather, vulcanized fiber, or some other similar material, and engaging with the surface of this disk is a friction-disk 24, made, preferably, of metal. The friction-disk 24 is keyed to a shaft 25, which extends parallel with an arm 26, forming a continuation of the side frame 10. The shaft 25 is carried in yokes 27 and 28, which are essentially identical in construction and are shown in detail in Fig. 4. Each yoke is provided with a swivel 29, mounted to turn vertically in a block 30 and having a groove 31 near its bottom, with which the end of a screw 32 engages to prevent vertical longitudinal movement of the swivel in the block. The block for the yoke 28 is rigidly carried at its lower end on a stub 33, secured to the arm 26. The corresponding block for the yoke 27 is longitudinally movable on a shank 34, mounted within a box 35, cast with said arm 26. The shank 34 is provided with an adjusting-screw 36, and between said adjusting-screw and the block 30 of the yoke 27 is a spring 37, the tension of which obviously tends to move the shaft 25 toward the arm 26 and to frictionally engage the disk 24 with the friction-wheel 23. In order to separate these engaging frictional surfaces, I employ a right-angle lever 38, which is pivoted to the box 35 and which engages the block 30 of the yoke 27.

The take-up reel 7, before referred to, comprises a core 39 and spider-arms 40, rigidly carried on a shaft 41, mounted in a bearing on the arm 26. Said shaft is driven from a crown-gear 42, with which engages a pinion 43 on the shaft 25. If desired, a spring 44 may be used, pressing upon the inner face of the gear 42, so as to retard the movements of the take-up reel when the film is being wound off of the same onto the let-off reel after the exhibition has been made. When the improved take-up mechanism is used in connection with a camera, obviously suitable provision is to be made for excluding light from the reel, but in other respects the construction may be unchanged.

In the operation of the projecting machine or camera the film 2 will be fed past the light-opening 4 and around the feed-roll 6, which is driven at the proper speed to always maintain the loop 9 between it and the intermittent feed-roll 5. The rotation of the shaft 13 for the driving of the feed-roll 6 rotates the friction-wheel 23, and the frictional engagement between this wheel and the disk 24 rotates the shaft 25, and through the gears 42 and 43 the shaft 41 of the take-up reel will be also rotated. The speed of rotation of the shaft 25 will be so proportioned that the surface velocity of the core 39 of the take-up reel will be at least as great as that of the feed-roll 6, so that at the commencement of the operation the film will be drawn taut between the take-up reel and the feed-roll 6. As the film accumulates on the take-up reel there will obviously be a relative slip between the elements of the frictional driving mechanism; but at all times the film will be properly stretched between the take-up reel and the feed-roll 6. After the exhibition has been made or the film properly exposed, the lever 38 is operated to disengage the disk 24 from the friction-wheel 23, the film is removed from the feed-rolls 3, 5, and 6, and by applying a crank to the let-off reel 1 the film can once again be wound up thereon and off of the take-up reel. In this unwinding operation the film will be maintained at the proper tension between the let-off reel and the take-up reel by applying a resistance to the take-up reel, as is plain—as, for instance, by means of the spring 44.

Having now described my invention, what I claim as new, and desire to secure by Letters Patent, is as follows:

1. In a take-up mechanism, the combination of a supporting-frame, a frictional driving-wheel rotatably carried by the frame, a feed-roll rotatably carried by the frame, means for continuously rotating said frictional driving-wheel and said feed-roll, a friction-disk engaging said wheel, a shaft on which the disk is carried extending substantially parallel with the frame, a take-up reel carried by the frame, operating connections between the shaft and the take-up reel, and means for relatively separating the driving-wheel and said disk, substantially as set forth.

2. In a take-up mechanism, the combination of a supporting-frame, a frictional driving-wheel rotatably carried by the frame, a friction-disk engaging said wheel, a shaft on which the disk is carried extending substantially parallel with the frame, a take-up reel carried by the frame, operating connections between the shaft and the take-up reel, and means for moving the disk away from the friction-wheel, substantially as set forth.

3. In a take-up mechanism, the combination of a supporting-frame, a frictional driving-wheel rotatably carried by the frame, a friction-disk engaging said wheel, a shaft on which the disk is carried extending substantially parallel with the frame, a take-up reel carried by the frame, operating connections between the shaft and the take-up reel, means for moving the disk away from the friction-wheel, and means for retarding the rotary movements of the take-up reel, substantially as set forth.

4. In a take-up mechanism, the combination of a supporting-frame, a frictional driving-wheel rotatably carried by the frame, a friction-disk engaging said wheel, a shaft on which the disk is carried extending substantially parallel with the frame, a take-up reel carried by the frame, operating connections between the shaft and the take-up reel, means for moving the disk away from the friction-wheel, and a spring for retarding the rotary movements of the take-up reel, substantially as set forth.

5. In a take-up mechanism, the combination of a frame, a friction-wheel mounted in said frame, a friction-disk engaging said wheel, a shaft on which said disk is carried extending substantially parallel with the frame, swivel-bearings for said shaft, means for moving the shaft toward and away from the frame to engage the disk with and disengage it from said wheel, a take-up reel, and operating connections between the take-up reel and said shaft, substantially as set forth.

6. In a take-up mechanism, the combination of a frame, a friction-wheel mounted in said frame, a friction-disk engaging said wheel, a shaft on which said disk is carried extending substantially parallel with the frame, swivel-bearings for said shaft, means for moving the shaft toward and away from the frame to engage the disk with and disengage it from said wheel, a take-up reel, operating connections between the take-up reel and said shaft, and a spring engaging one of the swivel-bearings for said shaft for elastically pressing the friction-disk into engagement with the friction-wheel, substantially as set forth.

This specification signed and witnessed this 2d day of January, 1901.

CHARLES H. KAYSER.

Witnesses:
PETER WEBER,
J. R. SCHERMERHORN.